(12) United States Patent
May (10) Patent No.: US 12,297,950 B2
(45) Date of Patent: May 13, 2025

(54) SPIRAL WRAP

(71) Applicant: Peter Andrew John May, South Perth (AU)

(72) Inventor: Peter Andrew John May, South Perth (AU)

(73) Assignee: Peter Andrew John May, South Perth (AU)

( * ) Notice: Subject to any disclaimer, the term of this patent is extended or adjusted under 35 U.S.C. 154(b) by 60 days.

(21) Appl. No.: 17/908,678

(22) PCT Filed: Sep. 1, 2021

(86) PCT No.: PCT/AU2021/051011
§ 371 (c)(1),
(2) Date: Sep. 1, 2022

(87) PCT Pub. No.: WO2022/047530
PCT Pub. Date: Mar. 10, 2022

(65) Prior Publication Data
US 2023/0332729 A1 Oct. 19, 2023

(30) Foreign Application Priority Data
Sep. 2, 2020 (AU) .............................. 2020903139

(51) Int. Cl.
*F16L 57/06* (2006.01)
*F16L 11/22* (2006.01)

(52) U.S. Cl.
CPC .............. *F16L 57/06* (2013.01); *F16L 11/22* (2013.01)

(58) Field of Classification Search
CPC ................................ F16L 57/06; F16L 11/22

USPC .......................................................... 138/135
See application file for complete search history.

(56) References Cited

U.S. PATENT DOCUMENTS

| 536,419 A | * | 3/1895 | Cochrane | H01P 3/14 138/120 |
| 630,635 A | * | 8/1899 | Sundh | F16L 11/16 174/109 |
| 769,366 A | * | 9/1904 | Waterman | F16L 11/16 126/307 R |

(Continued)

FOREIGN PATENT DOCUMENTS

| FR | 2119266 A5 | 8/1972 |
| WO | 98/16770 A1 | 4/1998 |
| WO | WO-2020/037353 A1 | 2/2020 |

OTHER PUBLICATIONS

International Search Report for International Application No. PCT/AU2021/051011 dated Ocotber 29, 2021.

(Continued)

*Primary Examiner* — David R Deal
(74) *Attorney, Agent, or Firm* — Harness, Dickey & Pierce, P.L.C.

(57) ABSTRACT

The invention relates to a spiral wrap formed of an extruded profile coiled along a helical path around an axis. The profile having a first section and a second section; the first section having a first lip directed towards the axis; and the second section having a second lip directed away from the axis. The first lip and the second lip are arranged such that one of the lips is always in contact with an adjacent coil such that the engagement of adjacent coils of the spiral wrap prevents gaps in protection from forming even when the spiral wrap is curved.

24 Claims, 8 Drawing Sheets

(56) References Cited

U.S. PATENT DOCUMENTS

| | | | | | |
|---|---|---|---|---|---|
| 840,766 | A | * | 1/1907 | Greenfield | F16L 11/16 138/135 |
| 1,068,553 | A | * | 7/1913 | Abell et al. | F16L 11/16 138/135 |
| 1,900,512 | A | * | 3/1933 | Madden | F16C 1/26 138/135 |
| 1,987,794 | A | * | 1/1935 | Phillips | H01B 7/226 174/109 |
| 3,616,123 | A | * | 10/1971 | Reynolds, Jr. | B29C 66/4329 138/131 |
| 4,800,928 | A | * | 1/1989 | Kanao | F16L 11/16 138/135 |
| 4,929,478 | A | * | 5/1990 | Conaghan | H02G 3/0462 428/36.1 |
| 5,730,188 | A | * | 3/1998 | Kalman | F16L 11/083 138/135 |
| 6,415,825 | B1 | * | 7/2002 | Dupoiron | F16L 11/088 138/131 |
| 6,906,264 | B1 | * | 6/2005 | Grant, Jr. | H01B 7/366 174/102 R |

OTHER PUBLICATIONS

Written Opinion for International Application No. PCT/AU2021/051011 dated Ocotber 29, 2021.
Written Opinion for International Application No. PCT/AU2021/051011 dated Jul. 5, 2022.
Extended European Search Report dated Aug. 8, 2024 for corresponding European Application No. 21863110.9.

\* cited by examiner

SPIRAL WRAP

CROSS-REFERENCE TO RELATED APPLICATIONS

This application is a national phase under 35 U.S.C. § 371 of PCT International Application No. PCT/AU2021/0510111 which has an International filing date of Sep. 1, 2021, which claims priority to Australian Application No. 2020903139, filed Sep. 2, 2020, the entire contents of each of which are hereby incorporated by reference.

FIELD OF THE INVENTION

The present invention relates to a spiral wrap.

BACKGROUND

It is known when using a number of hydraulic hoses and lines they are often formed into bundles or hose looms for organisational purposes which require protection from environmental conditions, particularly in drilling applications and more particularly in underground mining Damage to an outer casing of the hoses or lines can occur due to abrasion caused by dragging or rubbing against surfaces, or fragments of rock or swarf can become engaged with the bundle or gaps in protective cladding (e.g. spiral wrap). Underground mining, in particular, presents a severe environment for machinery and associated hoses and lines. Cladding is also required to protect hoses and lines from exposure to undesired chemicals.

Damaged hydraulic hoses or lines may also present significant danger to personnel. Failure of an outer casing may occur whereby the contents of hoses or lines, which are kept under pressure, are explosively released. In industrial high-pressure applications this has been known to cause significant injury and even death.

Known spiral wraps typically present gaps between coils when bending or curving, particularly when applied to tight turns. The gaps expose the wrapped hoses to the harsh environmental conditions and diminish to protection afforded by the spiral wrap.

Known spiral wraps present a problem when coils are compressed and the coils overlap one another. The overlapping forms gaps in the spiral wrap and is also known as cascading. Where cascading occurs the coils may also jam together forcing coils further along the wrap to extend detrimentally and present gaps in protection.

The present invention attempts to overcome at least in part the aforementioned disadvantages of previous spiral wraps.

SUMMARY OF THE INVENTION

In accordance with one aspect of the present invention there is provided a spiral wrap formed of an extruded profile coiled along a helical path around an axis:
- the profile having a first section and a second section;
- the first section having a first lip directed towards the axis; and
- the second section having a second lip directed away from the axis;
- wherein the first lip and second lip are arranged on opposite ends of the profile;
- wherein the first lip and the second lip are arranged such that one of the lips is always in contact with an adjacent coil; and
- wherein the spiral wrap has a fully retracted configuration and a fully extended configuration.

Preferably, the first lip and the second lip are arranged such that one of the lips is always in contact with and forms a barrier with an adjacent coil.

Preferably, the first section of a coil overlaps with the second section of an adjacent coil.

Preferably, the spiral wrap has a fully retracted configuration and a fully extended configuration. The fully retracted configuration being where a first lip of a coil is prevented from retracting further along the axis by the first section of an adjacent coil, and the fully extended configuration being where the first lip of a coil engages with the second lip of an adjacent coil preventing the spiral wrap from extending further along the axis.

Preferably, the profile is continuous and consistent throughout the extrusion.

Mentions of directions, such as inward and outward, are determined relative to the axis.

The objective of the present invention is to provide a spiral wrap that maintains protection for internal hoses and lines, and prevent gaps in protection from forming. In particular, the second section maintains protection for internal hoses and lines in extended configurations.

The engaging lips prevent adjacent coils from separating and forming gaps that would compromise protection and expose internal hoses and lines to detrimental environmental conditions. This may be apparent when the spiral wrap is in the extended configuration or when the spiral wrap is curved such that only some portions of the lips of adjacent coils are engaging.

Preferably, the spiral wrap is manufactured from a material with abrasive resistance and/or impact resistance properties. The choice of materials with these properties affords protection to the hoses or lines within the wrap against adverse environmental conditions.

The engaged lips prevent the coils of the spiral wrap from separating and forming a gap in protection.

In one preferred embodiment the first section further comprises a shoulder above where a first lip of a coil is stopped in the fully retracted configuration. The shoulder provides the first section with a means to retain the first lip of an adjacent coil against outward forces which may cause coils to overlap one another and form gaps in the spiral wrap (also known as cascading).

In one preferred embodiment the profile of the spiral wrap incorporates a recess in the first section adapted to receive the second lip of an adjacent coil. The recess further defines an intermediate point which may be a resting position, wherein the second lip may be partially stopped from extending or retracting, thus forming an intermediate configuration.

Preferably, the spiral wrap is manufactured from a semi-rigid material allowing the spiral wrap to be extended and contracted where desired whilst maintaining strength when interlocked.

In a preferred embodiment the spiral wrap is manufactured from a material which allows for elastic deformation.

Preferably, the original shape of the spiral wrap for the purposes of elastic deformation is where the spiral wrap is uniformly in a fully retracted configuration. This preference is well suited for transportation and storage of spiral wrap as each length of spiral wrap constitutes the maximum number of coils per unit length.

In a further preferred embodiment surfaces of the first lip and second lip that engage with one another are flat and parallel to each other. This allows for the engagement to be consistent. Alternatively to the surfaces being flat, the surfaces may incorporate uneven features which provide grip against undesired forces.

In a further preferred embodiment the first section is positioned further from the axis than the second section.

In a further preferred embodiment the first section is thicker than the second section. More preferably, the second section has a substantially flat inward side such that the tube formed by the spiral wrap is as clear and unobstructed as possible.

Preferably, the second section is thick enough to provide suitable abrasion resistance.

In one alternative preference, the original shape of the spiral wrap for the purposes of elastic deformation is where the spiral wrap is uniformly in a fully extended configuration. This preference is well suited for the workability of the spiral wrap as unlike the previous preference, the spiral wrap does not have to be under tension to be extended beyond the fully retracted configuration.

In another alternative preference, the original shape of the spiral wrap for the purposes of elastic deformation is uniformly at an intermediate point between the fully retracted configuration and the fully extended configuration. More preferably, the original shape of the spiral wrap for the purposes of elastic deformation is the intermediate point where a recess on one coil receives the second lip of an adjacent coil.

In a preferred embodiment, one end of a length of spiral wrap is adapted to receive a connector for fastening lengths of spiral wrap together. Typically, elongate building and construction materials are manufactured in predetermined lengths. In order to adapt these lengths to conditions on worksites the lengths can be cut or connected together. It is necessary that when multiple lengths of the spiral wrap of the present invention are be connected together the continuity of the profile is maintained and thus the protection afforded by the spiral wrap is also maintained. Preferably, the connector is removable.

BRIEF DESCRIPTION OF DRAWINGS

The present invention will now be described, by way of example, with reference to the accompanying drawings, in which.

DESCRIPTION OF PREFERRED EMBODIMENTS

The present invention relates to a spiral wrap formed of an extruded profile coiled along a helical path around an axis:
the profile having a first section and a second section;
the first section having a first lip directed towards the axis; and
the second section having a second lip directed away from the axis;
wherein the first lip and second lip are arranged on opposite ends of the profile;
wherein the first lip and the second lip are arranged such that one of the lips is always in contact with an adjacent coil; and
wherein the spiral wrap has a fully retracted configuration and a fully extended configuration.

The present invention provides a spiral wrap with a profile that is shaped such that the engagement of adjacent coils of the spiral wrap prevents gaps in protection from forming even when the spiral wrap is curved. In particular, the spiral wrap protects internal hoses and lines from detrimental environmental conditions, or minimises leakage from internal hoses and lines to escape the confinement of spiral wrap. It is noted that in some instances it is advantageous to allow some internal leakage to escape the confines of the spiral wrap as this presents an indication to a worker that a leak is present in that section of piping and thus may be actioned upon in order to fix the leak.

Referring to FIGS. 1 to 9a, there is shown a length of spiral wrap (10) formed of an extruded profile (20) coiled along a helical path around an axis (30). Mention of a single coil refers to a 360° turn of the spiral wrap around the axis (30).

Figure 1:
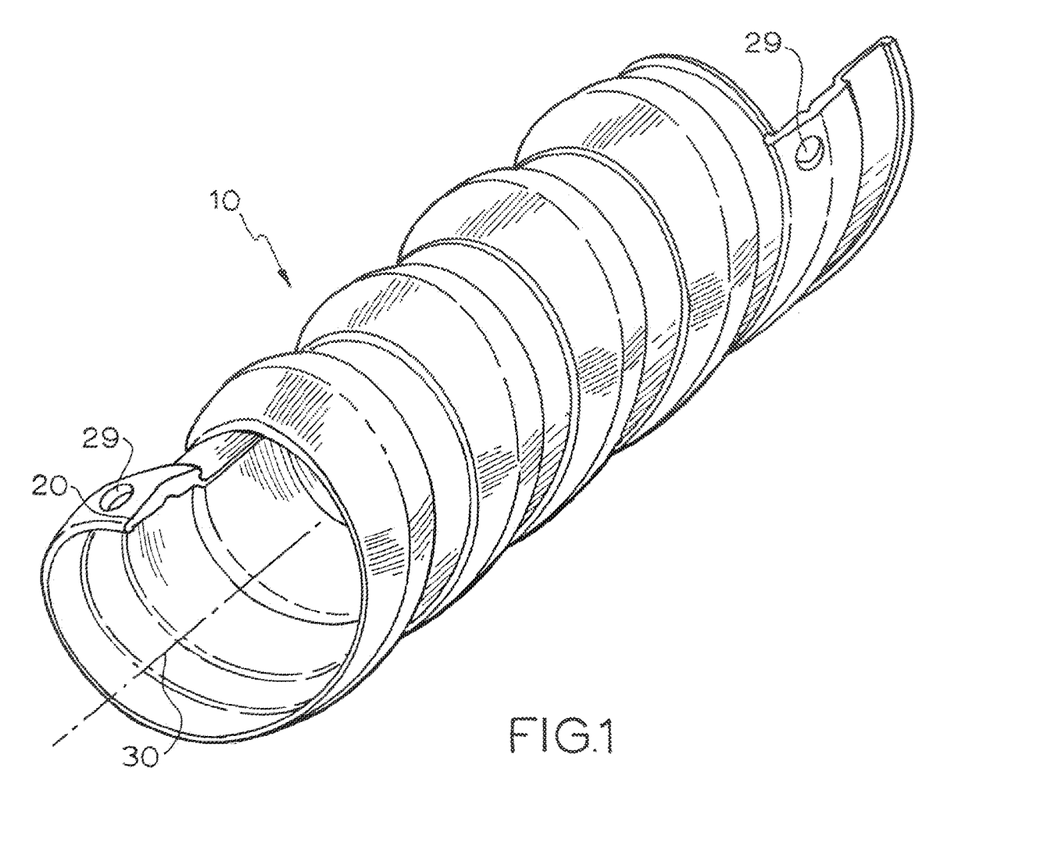
FIG. 1 is a perspective view of a length of spiral wrap in accordance with the present invention.
Figure 2:
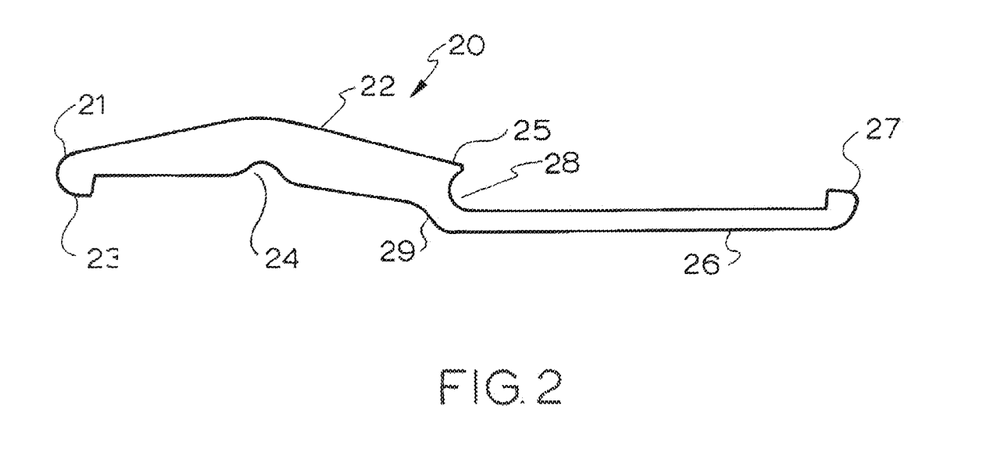
FIG. 2 is a plan view of a profile of a spiral wrap in accordance with the present invention.

The profile (20) is continuous and consistent throughout the extrusion. The profile has a first section (22) and a second section (26). The first section (22) has a first lip (23) directed towards the axis (30), the second section (26) has a second lip (27) directed away from the axis (30). The first lip (23) and second lip (27) are arranged on opposite ends of the profile (20). The first section (22) of a coil overlaps with the second section (26) of an adjacent coil.

The first section (22) has a curved, raised top and is thicker than the second section (26). The second section (26) has a flat bottom which forms the inward side of the spiral wrap (10) when coiled, so as to make the interior of the coiled spiral wrap (10) as clear and unobstructed as possible.

The first section (22) is positioned further from the axis (30) than the second section (26), allowing the second section (26) to move beneath the first section (22).

Holes (29) through the first section (22) are depicted on either side of the length of spiral wrap (10). The holes (29) are suitable as connection points for fixing lengths of spiral wrap together, or securing lengths of spiral wrap (10) for transportation and/or storage.

The first section (22) incorporates a shoulder (25) on the side closest the second section (26). The first section (22), the shoulder (25) and the second section (26) define a cavity (28) arranged to receive the edge (21) of the first section (22) furthest from the second section of an adjacent coil.

The first section (22) incorporates a recess (24) arranged to receive the second lip (27) of an adjacent coil.

A first position is defined where a first lip (23) of a coil engages with a second lip (27) of an adjacent coil. Where the coils of the spiral wrap (10) are continuously in the first position then the spiral wrap (10) is in a fully extended configuration.

Figure 3:
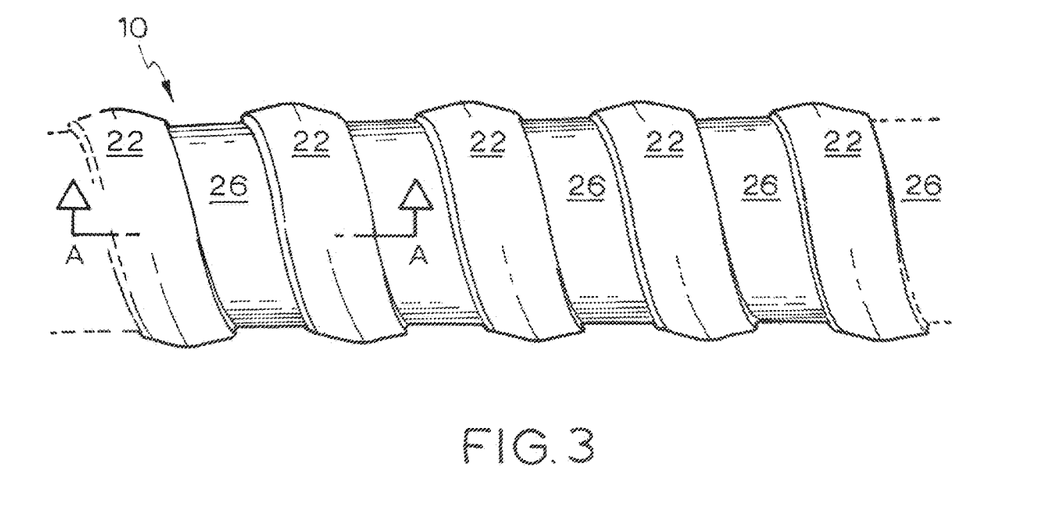
FIG. 3 is a plan view of length of spiral wrap in accordance with the present invention in a fully extended configuration.
Figure 4:
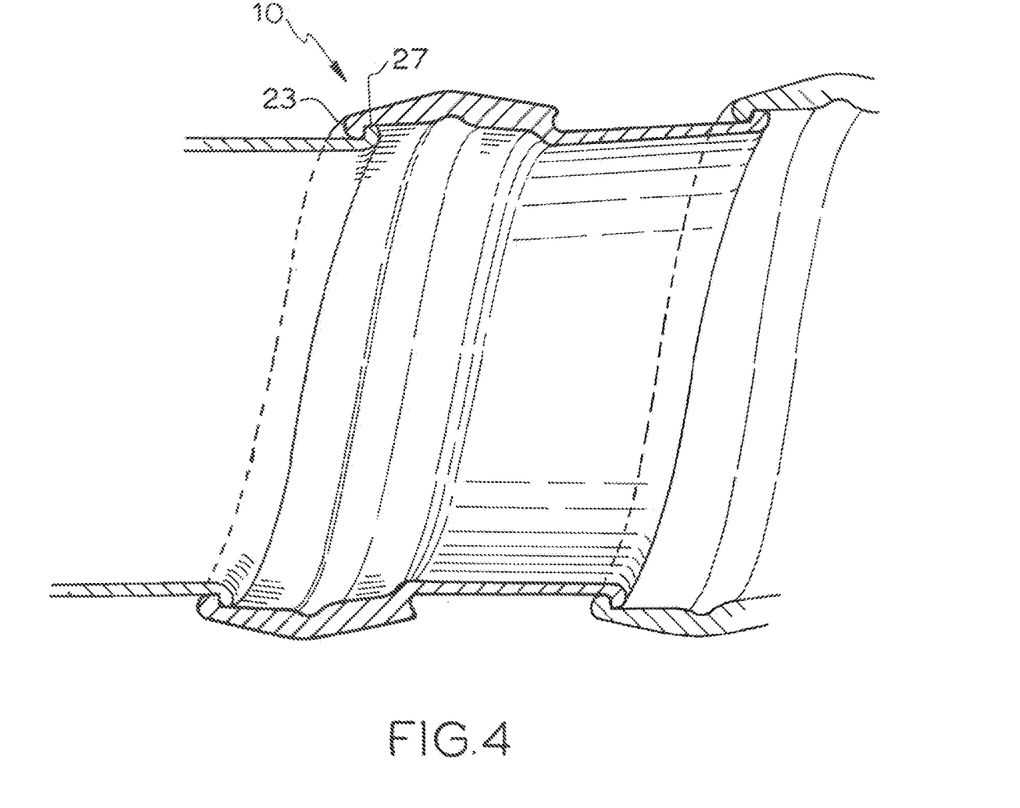
FIG. 4 is a section view A-A of length of spiral wrap in accordance with the present invention in a fully extended configuration.

FIGS. 3 and 4 depict the spiral wrap (10) in a fully extended configuration wherein the wrap is entirely in the first position. In the fully extended configuration the first lip (23) of one coil and second lip (27) of an adjacent coil are in contact.

The surfaces of the first lip (23) and second lip (27) which engage with one another are flat and parallel to each other.

A second position is defined where a recess (24) on one coil receives the second lip (27) of an adjacent coil. Where the coils of the spiral wrap (10) are continuously in the second position then the spiral wrap (10) is in an intermediate configuration.

Figure 5:
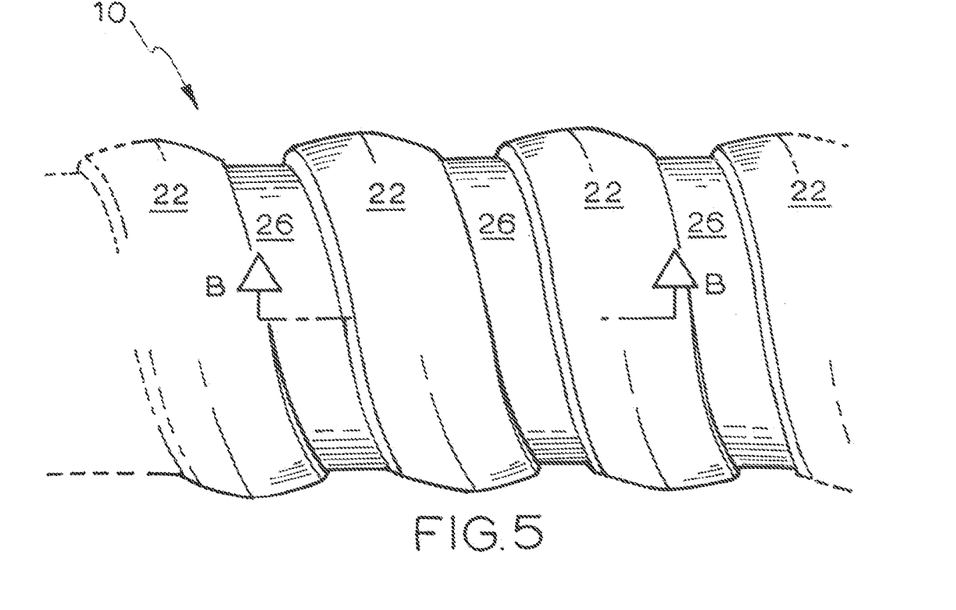
FIG. 5 is a plan view of a length of spiral wrap in accordance with the present invention in an intermediate configuration.
Figure 6:
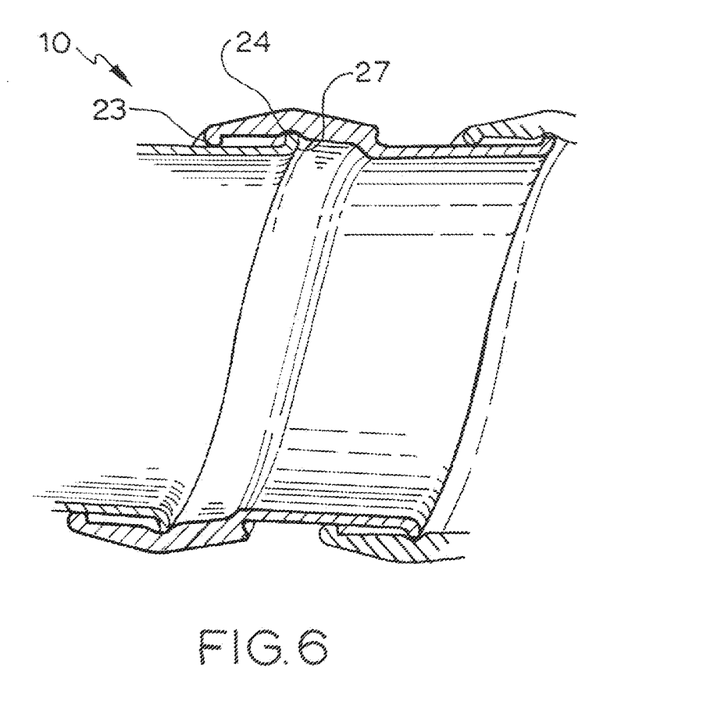
FIG. 6 is a section view B-B of a length of spiral wrap in accordance with the present invention in an intermediate configuration.

FIGS. 5 and 6 depict the spiral wrap (10) in an intermediate configuration wherein the wrap is entirely in the second position.

A third position is defined where an edge (21) of a first section (22) a coil is received in a cavity (28) of an adjacent coil. Further, the second lip (27) may contact the second segment (26) of an adjacent coil at point (28). Where the coils of the spiral wrap (10) are continuously in the third position then the spiral wrap (10) is in a fully retracted configuration.

Figure 7:
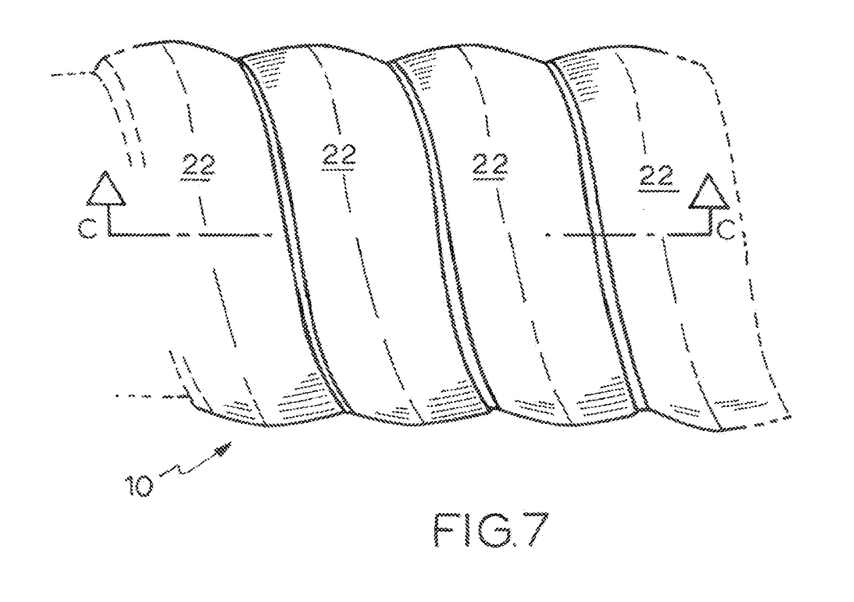
FIG. 7 is a plan view of a length of spiral wrap in accordance with the present invention in a fully retracted configuration.
Figure 8:
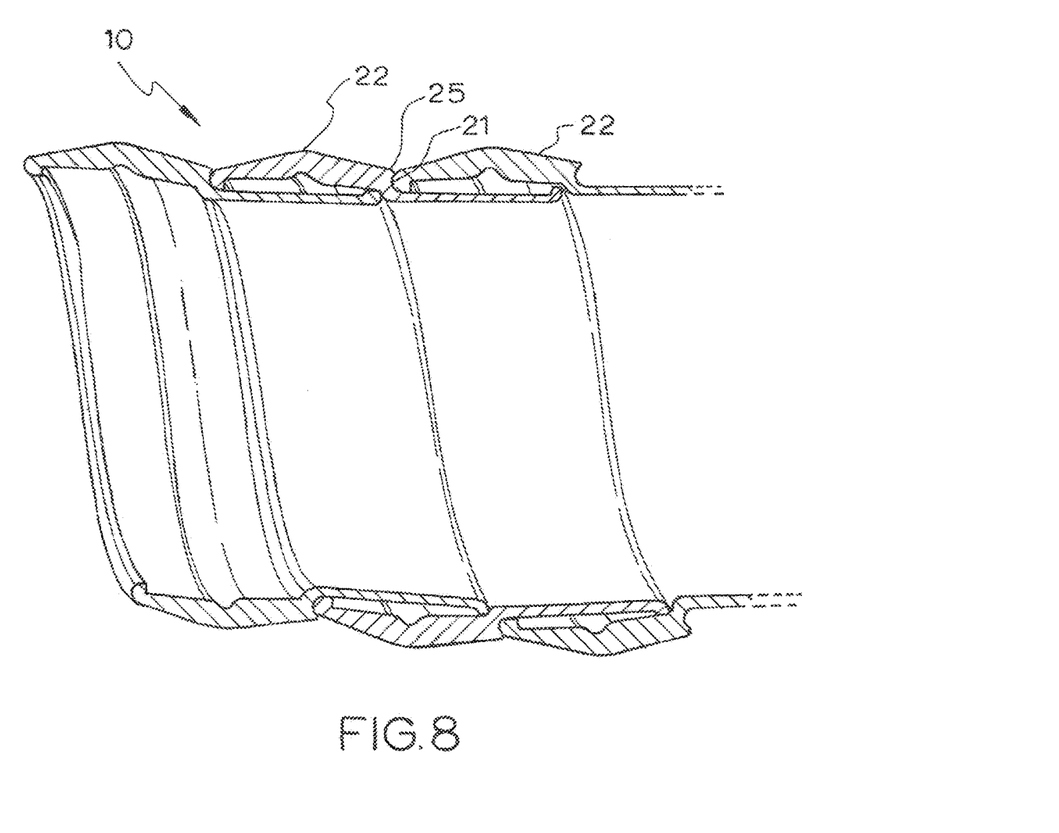
FIG. 8 is a section view C-C of a length of spiral wrap in accordance with the present invention in a fully retracted configuration.

FIGS. 7 and 8 depict the spiral wrap (10) in a fully retracted configuration wherein the wrap is entirely in the third position.

Figure 9:
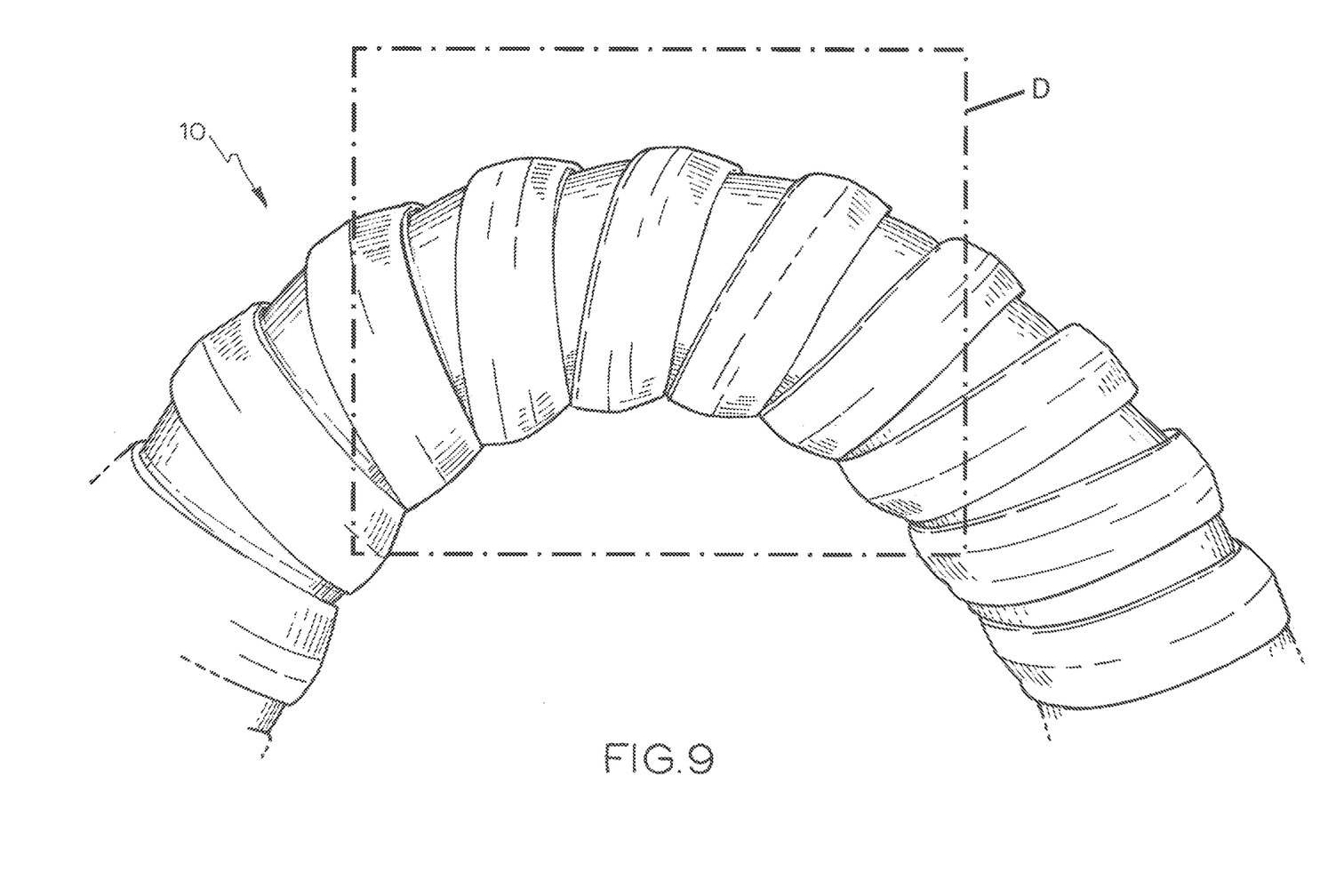
FIG. 9 is a plan view of a length of spiral wrap in accordance with the present invention curved.

FIG. 9 depicts a length of spiral wrap (10) in accordance with the present invention curved. The adjacent coils of the spiral wrap (10) on inner side of the curve are close to the third position; whilst the adjacent coils of the spiral wrap (10) on outer side of the curve are close to the first position.

Figure 9A:
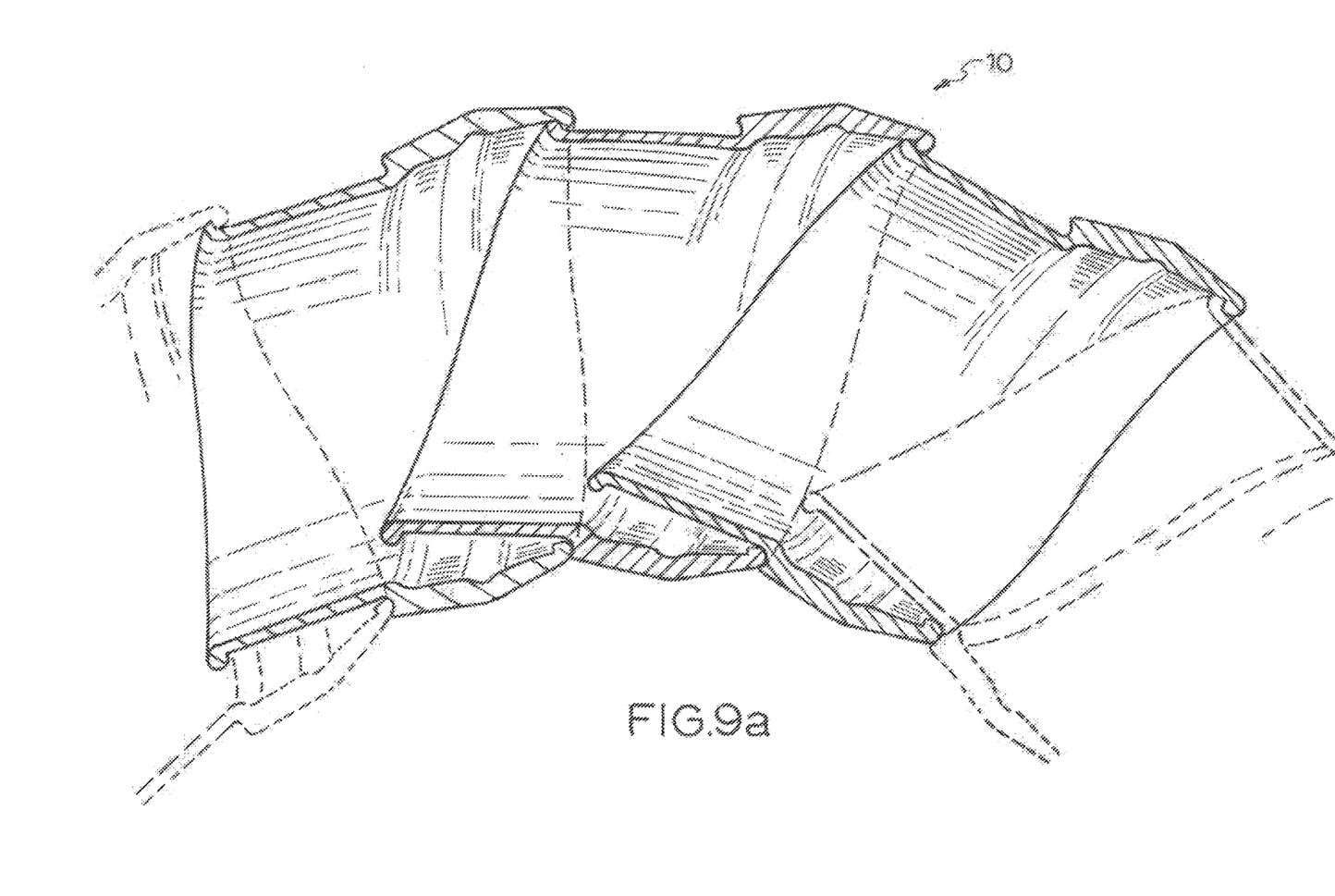
FIG. 9a is a is a cross-section view D of a length of spiral wrap in accordance with the present invention curved.

FIG. 9a depicts a length of spiral wrap (10) in accordance with the present invention curved. The adjacent coils of the spiral wrap (10) on inner side of the curve are close to the third position; whilst the adjacent coils of the spiral wrap (10) on outer side of the curve are close to the first position. Even when the spiral wrap (10) is curved the engagement of the lips prevent gaps from forming.

Figure 10:
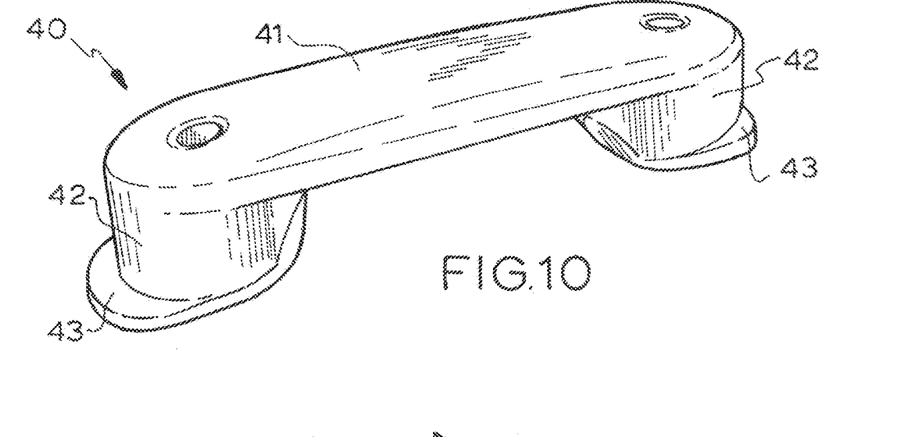
FIG. 10 is a perspective view of a connector for a spiral wrap in accordance with the present invention.

Referring to FIG. 10, there is shown a a-shaped connector (40) comprising a bridging member (41) with a pin (42) on either end. Each pin (42) has a splayed foot (43). The connector (40) is depicted as a separate piece that is removable from the spiral wrap (10).

Figure 11:
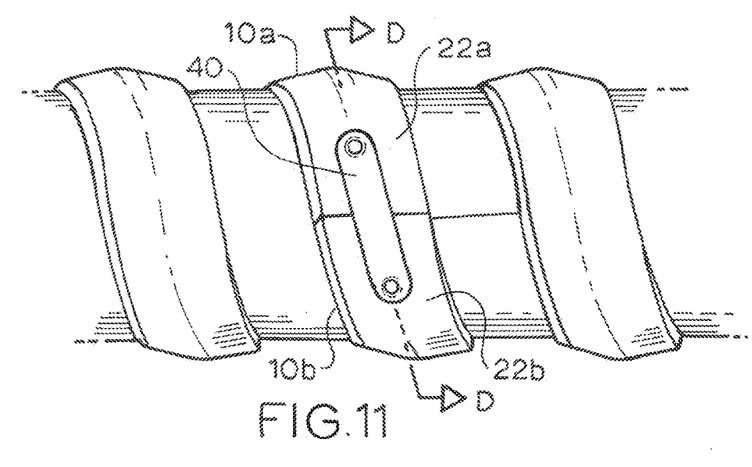
FIG. 11 is a plan view of two lengths of spiral wrap in accordance with the present invention fastened by a connector.
Figure 12:
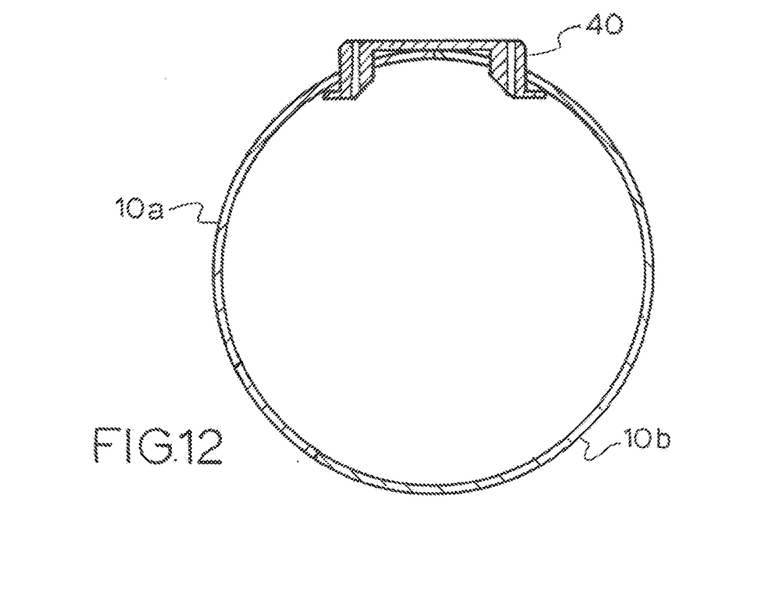
FIG. 12 is a section view D-D of two lengths of spiral wrap in accordance with the present invention fastened by a connector.

Referring to FIGS. 11 and 12, there is shown two lengths of spiral wrap (10), length a (10a) and length b (10b), fastened by a connector (40) through holes (29) in the first sections (22a/22b) of spiral wrap lengths (10a/10b).

To connect two lengths of spiral wrap (10a/10b), the lengths are placed together such that the profile (20) of each length of spiral wrap (10a/10b) align and the continuity of the profile (20) is maintained. One pin (42) is inserted through a hole (29) on one length of spiral wrap (10a) and the other pin (42) is inserted through a hole (29) on the other length of spiral wrap (10b). The splayed feet (43) prevent the connector (40) from being unintentionally removed.

In an alternative embodiment, a connector (40) may be integrated with the spiral wrap (10). One end of a length of spiral wrap (40) would incorporate a connector (40) fixed to the spiral wrap (10) whilst the other end of the spiral wrap (10) has a feature for receiving a connector (40) of another length of spiral wrap (10).

Preferably, the spiral wrap (10) is manufactured from a material with abrasive resistance and/or impact resistance properties.

Figure 13:
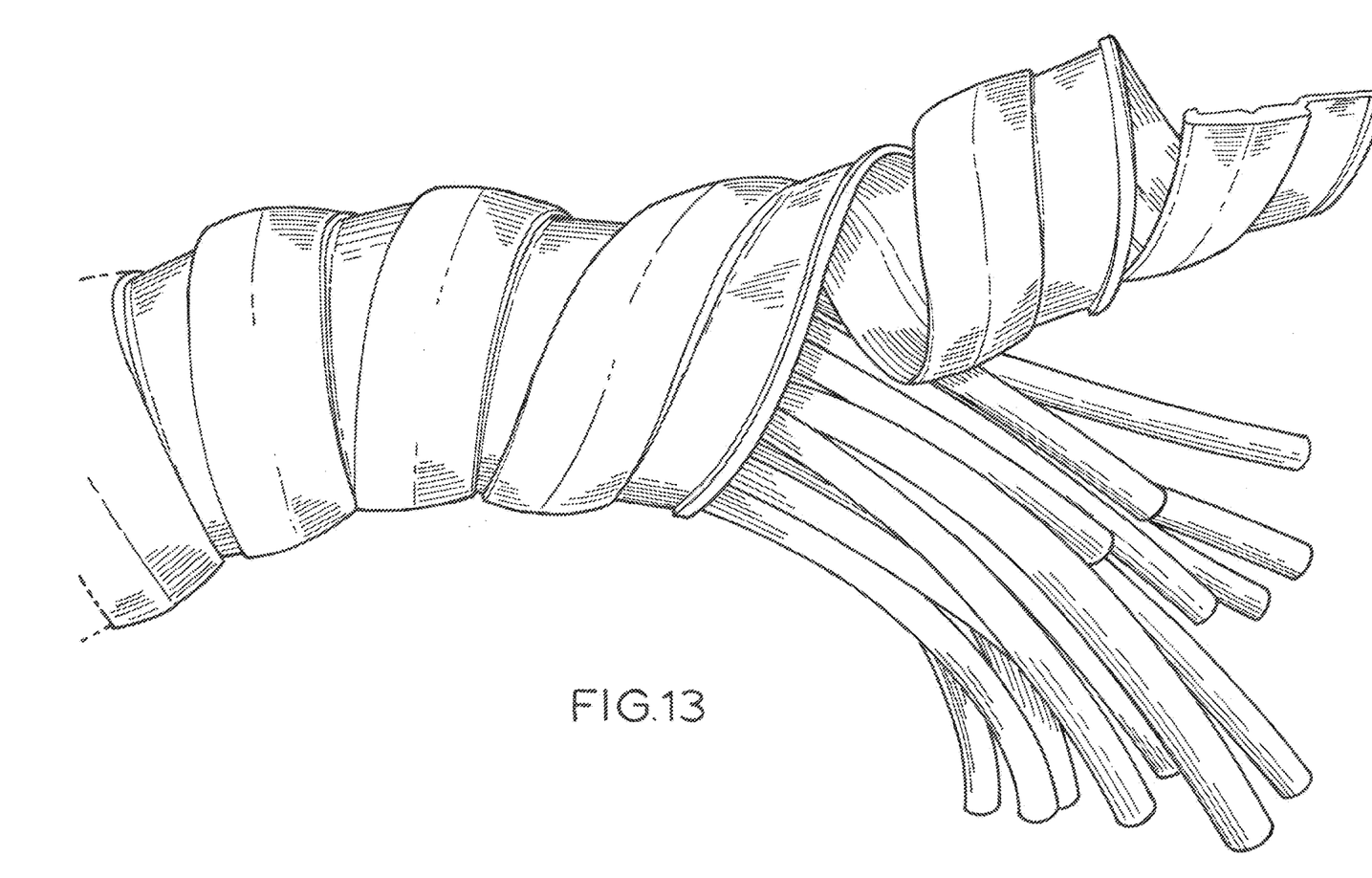
FIG. 13 is a perspective view of a spiral wrap in accordance with the present invention partially wrapping a bundle of hoses.

FIG. 13 depicts a spiral wrap in accordance with the present invention partially wrapping a bundle of hoses. The feature of spiral wrap to be able to wrap desired components, particularly components that are already installed on site, by winding a length of the wrap around the components is beneficial as components do not have to be disconnected or uncoupled on one or more ends in order to fit the protection onto them.

Modifications and variations as would be apparent to a skilled addressee are deemed to be within the scope of the present invention.

The invention claimed is:

1. A spiral wrap formed of an extruded profile coiled along a helical path around an axis and configured to wrap around desired components, including those already installed on a worksite, with:
  the profile having a first section and a second section;
  the first section having a first lip directed towards the axis; and
  the second section having a second lip directed away from the axis;
  wherein the first lip and second lip are arranged on opposite ends of the profile;
  wherein the first lip and the second lip are arranged such that one of the lips is always in contact with an adjacent coil;
  wherein the first section is thicker than the second section;
  wherein the spiral wrap has a fully retracted configuration and a fully extended configuration; and
  wherein the first section further comprises a shoulder above where the first lip of a coil is stopped in the fully retracted configuration.

2. A spiral wrap of claim 1 wherein, the first lip and the second lip are arranged such that one of the lips is always in contact with and forms a barrier with an adjacent coil.

3. A spiral wrap of claims 1 wherein, the first section of a coil overlaps with the second section of an adjacent coil.

4. A spiral wrap of claim 1 wherein, the fully retracted configuration defined as being where a first lip of a coil is prevented from retracting further along the axis by the first section of an adjacent coil.

5. A spiral wrap of claim 1 wherein, the fully extended configuration defined as being where the first lip of a coil engages with the second lip of an adjacent coil preventing the spiral wrap from extending further along the axis.

6. A spiral wrap of any of claim 1 wherein, the profile is continuous and consistent throughout the extrusion.

7. A spiral wrap of claim 1 wherein, the spiral wrap is manufactured from a material with abrasive resistance properties.

8. A spiral wrap of claim 1 wherein, the spiral wrap is manufactured from a material with impact resistance properties.

9. A spiral wrap of claim 1 wherein, the profile of the spiral wrap incorporates a recess in the first section adapted to receive the second lip of an adjacent coil.

10. A spiral wrap of claim 1 wherein, the spiral wrap is manufactured from a semi-rigid material.

11. A spiral wrap of claim 1 wherein, the spiral wrap is manufactured from a material which allows for elastic deformation.

12. A spiral wrap of claim 11 wherein, the original shape of the spiral wrap for the purposes of elastic deformation is where the spiral wrap is uniformly in a fully retracted configuration.

13. A spiral wrap of claim 11 wherein, the original shape of the spiral wrap for the purposes of elastic deformation is where the spiral wrap is uniformly in a fully extended configuration.

14. A spiral wrap of claim 11 wherein, the original shape of the spiral wrap for the purposes of elastic deformation is uniformly at an intermediate point between the fully retracted configuration and the fully extended configuration.

15. A spiral wrap of claim 14 wherein, the original shape of the spiral wrap for the purposes of elastic deformation is the intermediate point where a recess on one coil receives the second lip of an adjacent coil.

16. A spiral wrap of claim 1 wherein, surfaces of the first lip and second lip that engage with one another are flat and parallel to each other.

17. A spiral wrap of claim 1 wherein, surfaces of the first lip and second lip that engage with one another incorporate uneven features which provide grip.

18. A spiral wrap of claim 1 wherein, the first section is positioned further from the axis than the second section.

19. A spiral wrap of claim 1 wherein, the second section has a substantially flat inward side such that the tube formed by the spiral wrap is as clear and unobstructed as possible.

20. A spiral wrap of claim 1, the second section is thick enough to provide suitable abrasion resistance.

21. A spiral wrap of claim 1 wherein, one end of a length of spiral wrap is adapted to receive a connector for fastening lengths of spiral wrap together.

22. A spiral wrap of claim 21 wherein, the connector is removable.

23. A spiral wrap kit comprising a plurality of lengths of the spiral wrap of claim 22 and a plurality of the connectors.

24. A method of protecting desired components including hoses and lines comprising a step of winding a length of a spiral wrap according to claim 1 around the components which may already be installed on site.

\* \* \* \* \*